United States Patent [19]

Workman

[11] Patent Number: 4,679,103
[45] Date of Patent: Jul. 7, 1987

[54] DIGITAL SERVO CONTROL SYSTEM FOR A DATA RECORDING DISK FILE

[75] Inventor: Michael L. Workman, San Jose, Calif.

[73] Assignee: International Business Machines Corporation, Armonk, N.Y.

[21] Appl. No.: 857,263

[22] Filed: Apr. 29, 1986

[51] Int. Cl.[4] ........................... G11B 5/55; G11B 5/56
[52] U.S. Cl. ......................................... 360/77; 360/78
[58] Field of Search ..................................... 260/77, 78

[56] References Cited

U.S. PATENT DOCUMENTS 4,246,536  1/1981  Bradley et al. ..................... 324/177
4,486,797 12/1984  Workman ............................ 360/78

OTHER PUBLICATIONS

"Offset Force Correction for Disk File", IBM Technical Disclosure Bulletin, vol. 21, No. 5, (Oct. 1978), pp. 1792-1795.
"Track Seek Using Continuous Servo", IBM Technical Disclosure Bulletin, vol. 25, No. 9, (Feb. 1983) pp. 4572-4576.
"Digital Sector Servo System", IBM Technical Disclosure Bulletin, vol. 22, No. 6 (Nov. 1979), pp. 2476-2481.
"Quad-Burst PES System for Disk File Servo", IBM Technical Disclosure Bulletin, vol. 21, No. 2, (Jul. 1978) pp. 804-805.
"Design of a Disk File Head-Positioning Servo", IBM Journal of Research and Development, Nov. 1974, pp. 506-512.
"Design of Digital Control Systems Using State-Space Methods", *Digital Control of Dynamic Systems*, by Gene F. Franklin and J. David Powell, Jun. 1981.

*Primary Examiner*—George G. Stellar
*Attorney, Agent, or Firm*—Thomas R. Berthold

[57] ABSTRACT

A digital servo control system for a data recording disk file receives as input a digital head position error signal (PES) and a digital signal corresponding to the head actuator input signal, and outputs a digital control signal. The control signal is integrated and amplified to provide the input signal to the actuator. The control signal is calculated from estimated values of absolute head position, head velocity and the equivalent actuator input signal required to compensate for constant or very low frequency bias forces. The estimated values are functions of respective predicted values, which in turn are functions of, among other things, constants representing the digital sampling time and physical parameters of the actuator. The updating of the estimated values from the respective predicted values is made with the use of an error term, which is the error between the measured absolute head position and the predicted absolute head position. The predicted absolute head position is made sufficiently accurate that the error term is always less than a selected number of tracks. This permits the digital servo control system to operate during track seeking without counting track crossings so that the system is operable with servo information recorded either in sectors on a data disk or in continuous tracks on a dedicated servo disk.

16 Claims, 7 Drawing Figures (PRIOR ART) FIG. 1

HEAD ARRIVAL TRAJECTORIES FOR SERVO CONTROL SYSTEM WITH AND WITHOUT STIFFNESS INTEGRATOR (LARGE BIAS FORCES)

DIGITAL SERVO CONTROL SYSTEM FOR A DATA RECORDING DISK FILE

TECHNICAL FIELD

This invention relates to servo control systems for read/write head positioning in data recording disk files. More particularly, the invention relates to a single digital servo control system for both track seeking and track following which is usable with disk files having servo information on either a dedicated servo disk surface or in sectors on a data disk surface.

BACKGROUND OF THE INVENTION

Disk files are information storage devices which utilize a rotatable disk with concentric data tracks containing the information, a head for reading or writing data onto the various tracks, and an actuator connected by a support arm assembly to the head for moving the head to the desired track and maintaining it over the track centerline during read or write operations. The movement of the head to a desired track is referred to as track accessing or "seeking", while the maintaining of the head over the centerline of the desired track during a read or write operation is referred to as track "following".

The actuator is typically a "voice coil motor" (VCM) which comprises a coil movable through the magnetic field of a permanent magnetic stator. The application of current to the VCM causes the coil, and thus the attached head, to move radially. The acceleration of the coil is proportional to the applied current, so that ideally there is no current to the coil if the head is perfectly stationary over a desired track.

In disk files which have a relatively high density of data tracks on the disk, it is necessary to incorporate a servo control system to maintain the head precisely over the centerline of the desired track during read or write operations. This is accomplished by utilizing pre-recorded servo information either on a dedicated servo disk or on sectors angularly spaced and interspersed among the data on a data disk. The servo information sensed by the read/write head (or the dedicated servo head if a dedicated servo disk is used) is demodulated to generate a position error signal (PES) which is an indication of the position error of the head away from the nearest track centerline. One type of conventional servo pattern for use with either a sector servo disk or a dedicated servo disk is the quadrature pattern described by Mueller, et al. in *IBM Technical Disclosure Bulletin*, Vol. 21, No. 2 (Feb. 1978) pp. 804-805. In the quadrature pattern there are four unique track types which repeat so as to form radially repetitive four-track bands of servo information.

During track seeking, when the head is moving across the tracks, the PES is used to generate track crossing pulses. This track crossing information, together with the PES and a signal representing the desired or target track, is used to generate a total error signal. The total error signal is equal to the sum of the PES plus the difference between the position of the target track and the position of the actual track over which the head is located. The total error signal is then used in the servo feedback loop to compute the desired velocity of the head, via a reference velocity trajectory generator, to assure that the head arrives at the target track according to the optimum velocity trajectory to effect a move to the target track in minimum time. The computed velocity is then compared with the estimated velocity from an electronic tachometer to generate a velocity error signal to a power amplifier which in turn applies a control current to the VCM. An electronic tachometer for generating a velocity estimate from inputs of VCM control current and quadrature PES is described in U.S. Pat. No. 4,246,536 to Bradley, et al., which is assigned to the same assignee as this application. In some disk files the estimated velocity is provided by a mechanical tachometer, such as a linear variable differential transformer (LVDT).

During track following, when the head is located within the boundaries of the desired track, the PES alone is used in the servo feedback loop to generate a control signal to the VCM to move the head back to the track centerline.

A description of operation of a general disk file servo control system during track seeking and track following is given by R. K. Oswald in "Design of a Disk File Head-Positioning Servo", *IBM Journal of Research and Development*, November 1974, pp. 506-512.

In such conventional disk files, the use of track crossing pulses to determine the total error signal during a track seek requires additional costly and complex analog circuitry in the demodulator to generate the track crossing pulses from the PES. More importantly, in the case of disk files which use sector servo data, it is not possible to accurately count track crossing pulses directly from the PES since the head will typically have crossed numerous tracks between PES samples.

During operation of the disk file the VCM is subjected to certain generally constant or very low frequency forces which tend to bias the coil, and thus the attached head, away from the desired position, i.e. the position needed to follow the desired velocity trajectory during track seeking, or the position of the centerline of the desired track during track following. These bias forces are caused by such things as circulating air flow passing the coil and the arm assembly which connects the head to the coil, the movement of the flexible ribbon conductor connecting the coil and arm assembly to the read/write electronics of the disk file, friction between the bearings and guide rails of the actuator, and the gravitational effect on the coil and arm assembly if the radial access direction of the VCM is not perfectly aligned horizontally. In addition to bias forces, there is typically an input voltage offset in the power amplifier which supplies the control current to the VCM, so that even in the absence of a velocity error signal to the power amplifier, the VCM may experience a non-zero input current.

The bias forces and voltage offset have little effect on the performance of the servo control system during track seeking when the primary contribution to the total force on the actuator is that due to the current in the actuator. However, at the completion of a track seek and during track following, when the head is within approximately one-half track width of the centerline of the target track and when the total error signal is simply the PES, the bias forces and voltage offset are primary contributions to the PES and must be rapidly and effectively compensated by the control signal to the power amplifier to produce current in the VCM to maintain the head over the track centerline.

One technique for rapidly forcing the total error signal to zero during track following is to incorporate an integrator for the PES into the servo feedback loop.

This is accomplished by the use of a separate "stiffness" integrator which is switched into the servo feedback loop only during track following. However, use of the switchable stiffness integrator generates an electrical transient which occurs as a result of switching of the integrator when large system bias forces and voltage offset is present. In addition, the stiffness integrator must be switched in at precisely the proper moment. Both the transient caused by switching of the stiffness integrator and switching at the improper time can cause overshoot or undershoot of the head with respect to the centerline of the target track which thus delays the subsequent read or write operation.

An additional problem caused by bias forces in all disk files is that there is a gain in the feedback path around the power amplifier in the presence of a generally constant or very low frequency PES. In the case of disk files which use an electronic tachometer, this is because the electronic tachometer receives as input the VCM control current and the measured PES and, through a combination of control current integration and PES differentiation, estimates the velocity of the head. Thus, even if the head is stationary, but the coil and arm assembly is subjected to generally constant or very low frequency bias forces, the electronic tachometer will output a non-zero velocity estimate. In the case of disk files which use a mechanical tachometer, electrical offsets cause a non-zero output of estimated velocity even when the head is stationary.

SUMMARY OF THE IVENTION

The digital servo control system of the present invention receives as input, at discrete sample times, the PES and a digital value representative of the VCM current, and outputs, at discrete sample times, a digital control signal. The digital control signal is converted to an analog control signal and input to an integrating power amplifier which provides the control current input to the VCM.

The digital control signal is generated by a microprocessor attached by a data bus to associated memory devices. As part of the computation of the control signal for each PES sample, the microprocessor computes the measured absolute head position from the PES and an estimate of VCM current equivalent to the amount of current required to compensate for bias forces acting on the actuator. In addition, the microprocessor computes an estimate of the absolute head position relative to a fixed reference and an estimate of the head velocity. A digital velocity trajectory generator provides a value representative of the optimum velocity of the head as a function of the difference between the absolute position of the target track and the estimated absolute head position. A velocity error is then computed as the difference between the computed estimate of head velocity and the optimum velocity from the velocity trajectory generator. The microprocessor also computes an estimate of head acceleration from the measured VCM current and the estimated bias force equivalent VCM current. The estimated head acceleration, together with the velocity error and a value representative of the control signal for the prior PES sample, are used to form the digital control signal.

The estimated absolute head position, head velocity, and bias force equivalent VCM current are computed from respective predicted values of those terms. The predicted values are updated with each PES sample and are functions of, among other things, constants representing the digital sampling time and physical parameters of the VCM, such as frictional effects and force constants. The estimated values of these terms are computed with the use of an error term which is the difference between the computed measurement of absolute head position and the predicted absolute head position.

The estimation of head acceleration is made such that, during track following when the head is generally within one-half track of the centerline of the target track, the average value of the estimated head acceleration is zero. Thus when the head is relatively stationary and the VCM is subjected to bias forces, there is no feedback path around the integrating power amplifier which has a gain in the presence of bias forces.

With the use of the digital servo control system according to the present invention, it is not necessary to measure or estimate track crossings so that the system is fully operable with either a dedicated servo disk or a data disk with sector servo information. The prediction of the absolute head position is made with sufficient accuracy such that the error between the measurement of the absolute head position and the predicted absolute head position is always less than a specific number of tracks. For example, when the servo control system is utilized with a quadrature pattern in which the servo information is radially repetitive in four-track bands, it is only necessary to measure the position of the head within a band without knowing in which particular band the head is located.

The digital servo control system also includes means for computing a value representative of a correction signal to the digital control signal in order to compensate for voltage offsets to the integrating power amplifier. The correction signal is applied to the control signal and updated during track following.

For a further understanding of the nature and advantages of the present invention, reference should be made to the following detailed description taken in conjunction with the accompanying drawings.

DESCRIPTION

A. Prior Art

Figure 1:
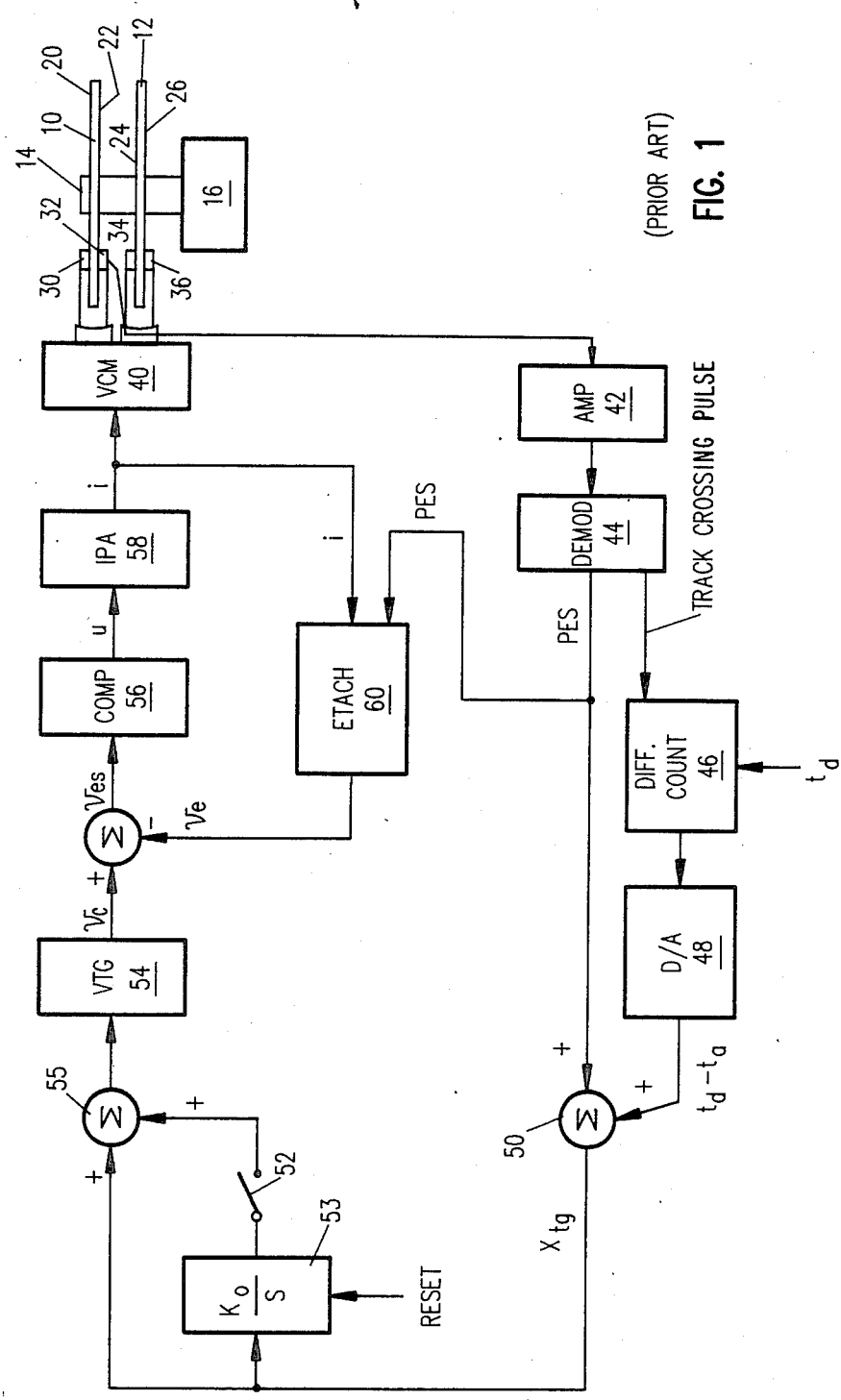
FIG. 1 is a block diagram of a conventional analog servo control system with a stiffness integrator switchable into the system during track following.

The block diagram of FIG. 1 is an illustration of a conventional analog disk file servo control system. A pair of disks 10, 12 are supported on a spindle 14 of the disk file drive motor 16. Each of the disks 10, 12 has two surfaces 20, 22 and 24, 26, respectively. For purposes of this description, surface 20 on disk 10 and surfaces 24, 26 on disk 12 are data recording surfaces. Surface 22 on disk 10 is a dedicated servo surface and contains only prerecorded servo information. The servo information is recorded in concentric tracks and is typically written in such a manner that the intersections of adjacent servo tracks on servo surface 22 are radially aligned with the centerlines of the data tracks on surfaces 20, 24, and 26. The servo information on surface 20 may be the quadrature pattern, as described in the previously cited reference by Mueller, et al.

The specific tracks on the data disks and the servo disk are accessed by heads 30, 32, 34, 36, each of which is associated with a respective disk surface and supported by an associated arm assembly. The heads 30, 32, 34, 36 are attached to a common accessing means or actuator, such as VCM 40. Thus the heads 30, 32, 34, 36 are all maintained in a fixed relationship with one another relative to the radial position on their respective disk surfaces.

The output of the dedicated servo head 32 is supplied to an amplifier 42 and then to a demodulator 44. Demodulator 44 processes the servo information signal from disk surface 22 and demodulates it to generate an analog PES. The PES from demodulator 44 is an indication of the position of servo head 32 away from the nearest servo track centerline, and thus the position of the data heads 30, 34, 36 away from the centerlines of the nearest data tracks on the respective disk surfaces 20, 24, 26. Demodulator 44 also provides a track crossing pulse which is input to a difference counter 46 and, if the servo pattern is a quadrature pattern, a signal (not shown) which identifies one of the four specific track types in the quadrature pattern.

The difference counter 46 also receives a command from the disk file control unit (not shown) indicating the target or desired track, denoted as $t_d$. With each track crossing by the servo head 32, the track crossing pulse causes the value of $t_d$ stored in difference counter 46 to be decremented. The output from difference counter 46 is passed to a digital-to-analog converter (D/A) 48 which provides an analog value representative of the number of tracks to go to reach the desired track, $t_d - t_a$, where $t_a$ is the nearest actual track position of servo head 32 at the time of the PES measurement.

The generation of track crossing pulses from the PES requires relatively costly and complex circuitry (not shown) in demodulator 44. The servo control system shown in FIG. 1 requires a dedicated servo disk and is not operable with sector servo information since during a track seek the head will typically cross numerous tracks between PES measurements. Thus, if the basic servo control system shown in FIG. 1 is to be operable with sector servo information, then an alternative to direct counting of track crossings must be used to determine the number of tracks to go, $t_d - t_a$.

The value $t_d - t_a$ from D/A converter 48 is then summed in junction 50 with the PES, the output of summing junction 50 being the total error signal representative of the distance-to-go, $x_{tg}$, to the centerline of the desired track.

The distance-to-go is fed to a velocity trajectory generator (VTG) 54 after addition in summing junction 55 with the output from switch 52. During a track seek, switch 52 is opened and the output of stiffness integrator 53 is reset to zero. The output of summing junction 55 is then only $x_{tg}$. Within some specified distance from the target track, for example less than one-quarter of a track width, the switch 52 is closed, the reset signal is removed from stiffness integrator 53 and stiffness integrator 53 is allowed to operate. When switch 52 is closed the input to VTG 54 consists of $x_{tg}$ and the integral of $x_{tg}$. During track following the effect of stiffness integrator 53 on the servo control system is to force the average value of $x_{tg}$ (which is equal to the PES) to zero.

VTG 54 computes a commanded velocity, $v_c$, based upon the value of $x_{tg}$. Conventional analog type velocity trajectory generators are typically either diode breakpoint or multiplier circuit implementations, both of which are described and shown as prior art in FIGS. 1A and 1B of U.S. Pat. No. 4,486,797 to Workman, which is assigned to the same assignee as this application.

Located between VTG 54 and VCM 40, as shown in FIG. 1, is a compensator 56 and an integrating power amplifier (IPA) 58. The compensator 56 contains circuitry having specific gain and phase shifting characteristics to assure stability and performance of the overall closed loop system. The output of compensator 56 is the control signal, u, which is directed to IPA 58 where the compensated control signal is integrated and amplified to generate a control current, i, to VCM 40. The control current to VCM 40 is a specific current level to move the coil so that the servo head 32, and thus the data heads 30, 34, 36, are moved with the desired velocity toward the centerline of the desired track.

An electronic tachometer (ETACH) 60 is located in a feedback path around the compensator 56 and IPA 58. ETACH 60 receives as inputs the VCM control current, i, from IPA 58 and the PES from demodulator 44. The output of ETACH 60 is an estimate of the velocity of the head. ETACH 60 provides a signal, $v_e$, based upon a combination of the differentiated PES and integrated control current i. A more thorough description of ETACH 60 is set forth in the previously cited patent to Bradley, et al. The result of the incorporation of ETACH 60 in the servo feedback loop is that the input to compensator 56 is a velocity error signal, $v_{es}$, which is the difference between the commanded velocity, $v_c$, output by VTG 54 and the estimated velocity, $v_e$, output by ETACH 60.

During track following, if the servo head 32 is stationary but the VCM 40 is subjected to bias forces, ETACH 60 continues to provide a feedback path around the IPA 58 and thus continues to generate a non-zero velocity estimate, $v_e$.

During a track seek, switch 52 is opened so that stiffness integrator 53 is bypassed. VTG 54 computes the velocity signal, $v_c$, as a non-linear function of $x_{tg}$ by a reference curve, as explained in the prior art description of the previously cited patent to Workman. The total error signal, $x_{tg}$, is the sum of the PES and the computed number of tracks to go, $t_d - t_a$. However, near the completion of a seek, when the head has approached to within approximately one-quarter track of the centerline of the desired track, switch 52 is closed, thus switching stiffness integrator 53 into the servo feedback loop. At this time the total error signal, $x_{tg}$, is simply the PES since the head is now within the track boundaries of the desired track. Stiffness integrator 53 now rapidly drives the total error signal to zero. VTG 54 now provides a velocity command, $v_c$, which is a linear function of the output from summing junction 55.

The switching of stiffness integrator 53 into the servo loop near the termination of a track seek causes a transient in the velocity command, $v_c$, which causes overshoot or undershoot of the head with respect to the centerline of the desired track, thus delaying the subsequent read or write operation.

B. Preferred Embodiment

Figure 2:
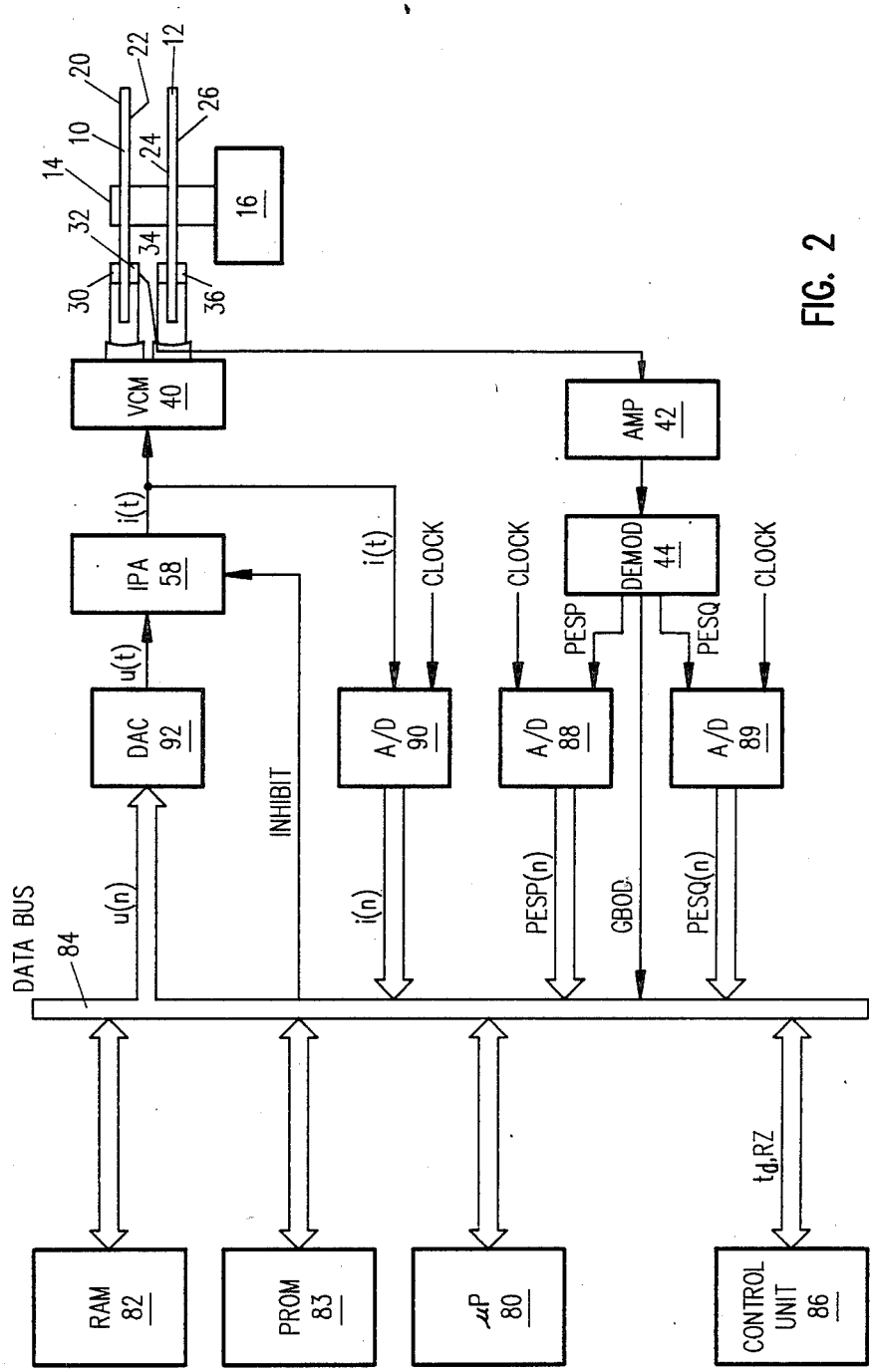
FIG. 2 is a block diagram of the digital servo control system of the present invention.

A simplified block diagram of the digital servo control system of the present invention is shown in FIG. 2. A microprocessor 80 is connected to a random access memory (RAM) 82 and a programmable read only memory (PROM) 83 via a data bus 84. The disk file control unit 86 is also connected to data bus 84. Control unit 86 provides numerous commands to microprocessor 80, including a signal, $t_d$, representing the target track, and a signal, RZ, representing a "re-zero" to initialize the servo control system. Not shown in FIG. 2 are address and control lines for microprocessor 80. The analog portion of the servo control system is shown essentially to the right of data bus 84 in FIG. 2.

The signal read by servo head 32 is input to amplifier 42 and then demodulator 44. While the invention is operable with any of numerous types of servo patterns and servo signal demodulation techniques, the servo control system will be explained with reference to a quadrature servo pattern. The quadrature pattern on servo surface 22 is demodulated by demodulator 44 in the following manner. First, demodulator 44 receives the quadrature servo signal from amplifier 42 and generates two separate analog waveforms, which are designated primary (PESP) and quadrature (PESQ), as shown in FIG. 2. The analog PESP and PESQ signals from demodulator 44 are sent to analog-to-digital (A/D) converters 88, 89, respectively. The discrete values of PESP and PESQ at any sample time are designated PESP(n) and PESQ(n), where n represents a time index for each digital sample. PESP(n) and PESQ(n) are then used by microprocessor 80 to determine on which of the four tracks in one of the four-track bands of the quadrature pattern the servo head 32 is located. Once that has been determined, then the selection of the correct signal, i.e. either PESP(n) or PESQ(n), is made to determine PES(n). The determination of track type, denoted $t_q(n)$, and PES(n) is made according to the following truth table.

TABLE 1

| PESP to PESQ Relationship | Track Type, $t_q(n)$ | PES(n) |
| --- | --- | --- |
| [PESP(n) < PESQ(n)] and [PESP(n) > −PESQ(n)] | 0 | PESP(n) |
| [PESP(n) < PESQ(n)] and [PESP(n) < −PESQ(n)] | 1 | PESQ(n) |
| [PESP(n) > PESQ(n)] and [PESP(n) < −PESQ(n)] | 2 | −PESP(n) |
| [PESP(n) > PESQ(n)] and [PESP(n) > −PESQ(n)] | 3 | −PESQ(n) |

Figure 3:
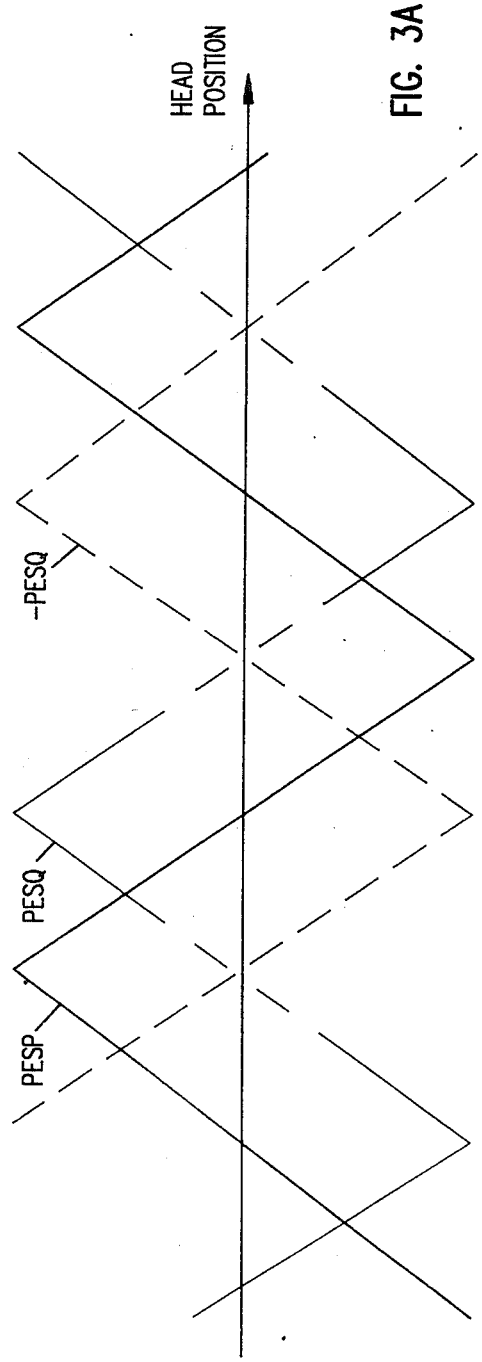
FIG. 3 is an illustration of servo signals from a quadrature pattern and the manner in which the signals are compared to identify a specific track in one of the four-track bands in the quadrature pattern.

The truth table in Table 1 can also be understood by reference to FIG. 3. FIG. 3A represents the PESP and PESQ signals output by demodulator 44 as a function of radial position of servo head 32. FIGS. 3B and 3C are the digital values of the two comparisons of PESP(n) to +/−PESQ(n). FIG. 3D is the digital track type signal, $t_q(n)$, computed from the logic of Table 1. In the preferred embodiment $t_q(n)$ and PES(n) are computed by microprocessor 80. Alternatively, Table 1 can be implemented in analog hardware and the resulting track type number, $t_q(n)$, input to data bus 84. Similarly, PESP and PESQ can be selected thru analog switches to generate, according to the logic of Table 1, a PES which is then sent to a single A/D converter.

Referring again to FIG. 2, demodulator 44 also provides directly to data bus 84 a one-bit digital signal, GBOD, to indicate that servo head 32 is located over the "guard band outside diameter", i.e. the radially outermost head position in the disk file. This signal is generated from a special code recorded on the radially outermost track on servo surface 22.

IPA 58 provides the analog control current, i(t), to VCM 40 and as feedback to A/D converter 90. A/D converter 90 provides to data bus 84 a digital current sample, i(n), corresponding to the sample of analog current, i(t).

Thus, as shown in FIG. 2, the data inputs to microprocessor 80 of the digital servo control system for purposes of this explanation are control unit commands for target track $t_d$ and re-zero RZ, head position relative to nearest track centerline PES(n), which is determined from PESP(n) and PESQ(n) according to Table 1, VCM control current i(n), and GBOD.

A digital control signal, u(n), is output by microprocessor 80 to a digital-to-analog converter (DAC) 92. As shown in FIG. 2, A/D converters 88, 89, 90 are driven by the same clock input so that the digital sampling of PESP, PESQ and i, all occur simultaneously. The output of the control signal u(n) computed from the digital sample of PESP(n), PESQ(n) and i(n) occurs after a fixed calculation delay time and before the input of the next digital sample of PESP(n+1), PESQ(n+1) and i(n+1). DAC 92 provides the analog control signal, u(t), to IPA 58.

Microprocessor 80 also sends a special inhibit signal to IPA 58. IPA 58 is inhibited when the servo control system is first turned on to prevent any initial signal conditions from causing undesired movement of VCM 40.

The simplified block diagram of FIG. 2 is intended only to represent possible hardware implementation of the digital servo control system. An important feature of the digital servo control system which is not shown in FIG. 2, but which will be explained below, is the manner in which the microprocessor 80 computes the control signal u(n) so as to eliminate the necessity of a stiffness integrator and the adverse effects of a feedback path around the IPA 58 which has a gain in the presence of bias forces.

The microprocessor 80 uses an algorithm, referred to as a state estimator, to estimate absolute head position $x_e$, head velocity $v_e$, and head acceleration $a_e$. The *estimated* head position, velocity and acceleration for each digital sample n are functions of the *predicted* head position, velocity and acceleration, the measured head position and the measured VCM current. The predicted head position, velocity and acceleration are updated with each sample and are derived from functions based upon a physical model of the VCM and arm assembly.

The operation of the digital servo control system, and in particular the state estimator, will be explained with reference to the graphical representation of FIG. 4. It should be noted that the items in the non-analog portions of FIG. 4, such as the summing junctions, are not discrete hardware components but merely graphical aids to assist in understanding the computations performed by microprocessor 80.

Figure 4:
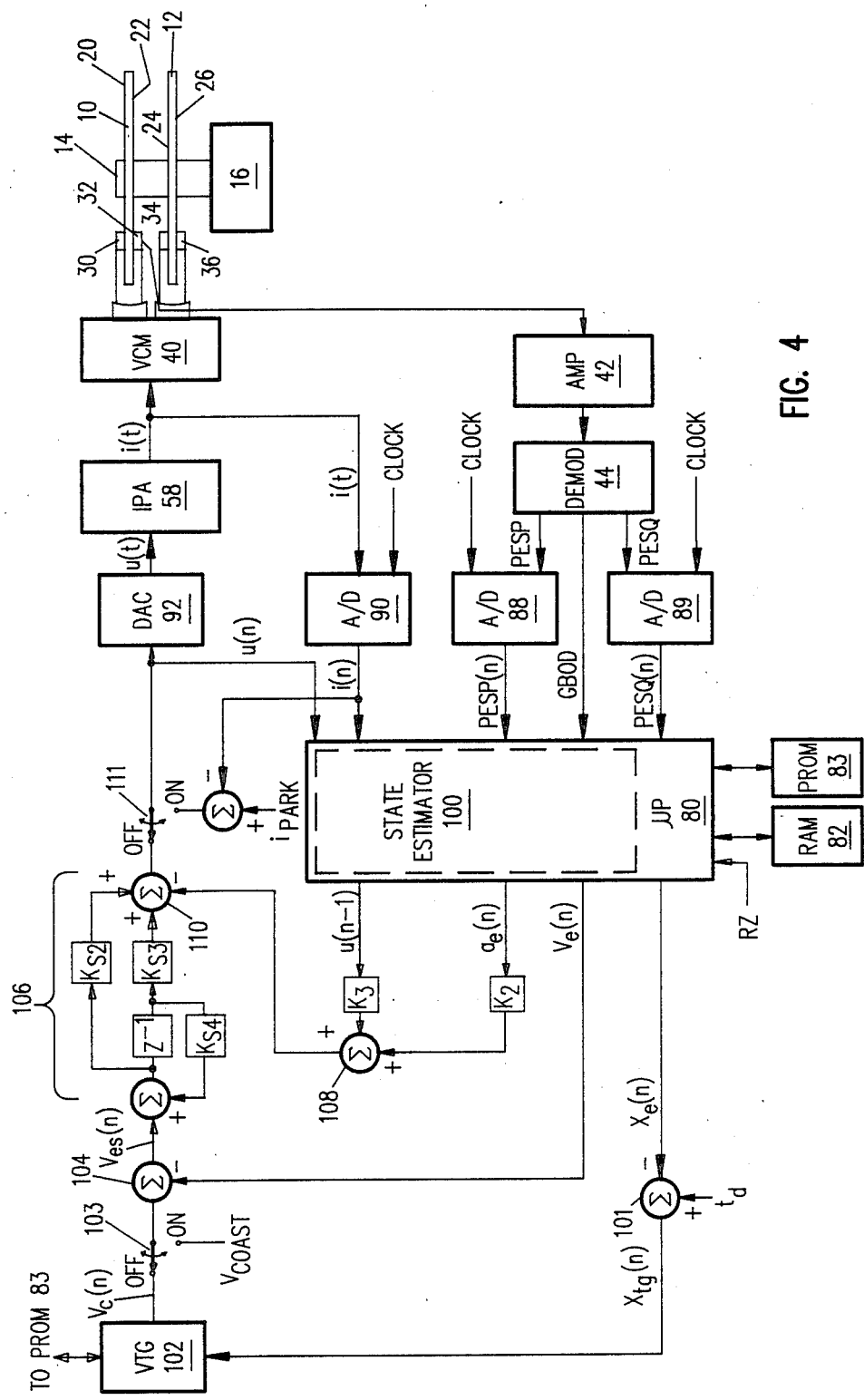
FIG. 4 is a graphical representation illustrating the function of the state estimator and control signal algorithm of the digital servo control system.

As shown in FIG. 4, the state estimator 100 generates outputs of $x_e(n)$, $v_e(n)$ and $a_e(n)$. The difference between the target track $t_d$ from control unit 86 (FIG. 2) and the estimated head position $x_e(n)$ is the "distance-to-go", $x_{tg}(n)$, which is represented as the output of summing junction 101 and is input to VTG 102. The input signal representing $x_{tg}(n)$ is operated on in digital VTG 102 to form an output address which is then input to a lookup table stored in PROM 83. The output from PROM 83 is a digitized value for the velocity curve which is used directly as a digital velocity command output, $v_c(n)$, from VTG 102. A more thorough description of digital VTG 102 is given in the previously cited Workman patent. Alternatively, VTG 102 may utilize a digital curve implementation, as shown in FIG. 1C of the Workman patent. The output of VTG 102 is a velocity command, $v_c(n)$, which is a function of the distance-to-go, $x_{tg}(n)$. If the head is within approximately plus or minus one-half track of the centerline of the target track $t_d$, then $v_c(n)$ is essentially a linear function of the input, $x_{tg}(n)$, and can be represented as $k_1 x_{tg}(n)$, where $k_1$ is a constant.

The output $v_c(n)$ of VTG 102 is a signal representative of the optimum velocity of the head for the particular sample n and distance to the target $x_{tg}(n)$. This value is then compared, as shown by summing junction 104, with the estimated velocity $v_e(n)$ generated by state estimator 100. The difference between $v_c(n)$ and $v_e(n)$ is the velocity error signal, $v_{es}(n)$, from summing junction 104.

Located between VTG 102 and summing junction 104 is a switch 103 for switching VTG 102 out of the servo control system. When switch 103 is "switched on" microprocessor 80 provides a constant velocity, $v_{coast}$, to summing junction 104. Switch 103 is switched on and the constant velocity input $v_{coast}$ is provided during initialization of the servo control system in order to cause the servo head 32 to "coast" at constant velocity from the inside diameter to the guard band outside diameter. Thus, during the coast phase $v_{es}(n)$ from summing junction 104 is the difference between $v_{coast}$ and the estimated head velocity $v_e(n)$.

The value of $v_{es}(n)$ from summing junction 104 is operated on by a lead-lag algorithm, which is represented graphically as a lead-lag network 106, and then input to summing junction 110.

As shown between state estimator 100 and summing junction 108, the estimated head acceleration, $a_e(n)$, from state estimator 100 is multiplied by a constant scale factor $k_2$, and the prior control signal $u(n-1)$ is multiplied by a constant scale factor $k_3$. These two products are then summed, as shown by summing junction 108, and the sum subtracted from the output of lead-lag network 106, as shown by summing junction 110. The result is the digital control signal, $u(n)$, which is input to DAC 92.

Located between summing junction 110 and DAC 92 is a switch 111 for switching the normal control signal out of the servo control system. When switch 111 is "switched on", microprocessor 80 provides a control signal to DAC 92 which is equal to $i(n) - i_{park}$, where $i_{park}$ is a constant current level. The purpose of switch 111 is to "park" the actuator by moving VCM 40 up against the inside diameter crash stop of the disk file. When the actuator is parked, servo head 32 is located over the radially innermost track.

As described and illustrated by FIG. 4, the control signal $u(n)$ is expressed as follows:

$$u(n) = -k_3 u(n-1) - k_2 a_e(n) + (k_{s3} + k_{s2} \cdot k_{s4}) d_{s1}(n) + k_{s2} \cdot v_{es}(n), \quad (1)$$

where $d_{s1}(n)$ is the state variable of the lead-lag network 106 and is determined by $$d_{s1}(n) = v_{es}(n-1) + s_4 d_{s1}(n-1). \quad (2)$$

The last two terms in equation (1) are the output from lead-lag network 106 and are strictly a function of constant scale factors, $k_{si}$, and the present and prior velocity error signals, $v_{es}(n)$ and $v_{es}(n-1)$, respectively.

The algorithm for computing $x_e(n)$, $v_e(n)$ and $a_e(n)$, and ultimately the control signal $u(n)$, will now be explained with reference to the flow chart of FIG. 5 and, where indicated, the block diagram of FIG. 4. This explanation will begin with the initial "power on" of the disk file, after which the servo control system is initialized, and then with operation during track seeking and following.

When the disk file is first turned on, the inhibit signal to IPA 58 is on, thus preventing any initial signal conditions to IPA 58 from causing movement of VCM 40. The servo control system then undergoes a "re-zero" routine and receives the re-zero command, RZ, from control unit 86.

If a re-zero command has been received by microprocessor 80, then the servo control system's initial function is to park the actuator. The park phase is commenced by turning on switch 111. This prevents the otherwise normal control signal from reaching DAC 92. The control signal to DAC 92 is now equal to the current to VCM 40 less a constant value, $i_{park}$. The current to VCM 40 will increase until it reaches the value $i_{park}$. VCM 40 will accelerate until it reaches the crash stop and will be maintained at the crash stop as long as switch 111 is on. The park phase continues for a predetermined time delay which is sufficient to assure that VCM 40 has been parked.

After the time delay, the state estimator 100 initializes the estimated values by setting $x_e$ equal to $x_{max}$, the largest possible absolute head position, and $v_e$ and $a_e$ to zero. Switch 111 is then turned off, so that the normal control signal $u(n)$ is provided to DAC 92.

Following the park phase, the servo control system commences the coast phase, the purpose of which is to move VCM 40 from the inside diameter crash stop to the radially outermost track, i.e. the guard band outside diameter. This is commenced by turning switch 103 on to switch VTG 102 out of the servo control system.

Since the servo head 32 is now moving across the tracks, n is set equal to zero and the sampling of PESP(n) and PESQ(n) begins. GBOD is also input to microprocessor 80 and has an initial value of zero. The coast phase continues so long as both switch 103 is on and GBOD equals zero, indicating that servo head 32 has not yet reached the guard band outside diameter.

During the first digital sample of PESP(n) and PESQ(n), microprocessor 80 computes the absolute head position, $x_a$, relative to some fixed reference, such as track zero, which is typically the guard band outside diameter. The term $x_a(n)$ is computed according to the following equations (3) and (4).

$$x_m(n) = TW \cdot t_q(n) + PES(n) \quad (3)$$

$$x_a(n) = J(4TW) + x_m(n) \quad (4)$$

As previously described, PES(n) is the distance of the head from the nearest track centerline and is computed from the logic of Table 1. The term "$TW \cdot t_q(n)$" is the "track width" times the digital value corresponding to the track type. Thus in equation (3) the term $x_m(n)$ is the measured position of the head within some four-track band of the quadrature pattern. In equation (4) the term $x_a(n)$, i.e. the measured absolute position of the head relative to a fixed reference, is equal to $x_m(n)$ plus some integral multiple, denoted "J", times the width of a four-track band (4TW). In the operation of the servo control system, only $x_m(n)$ is actually measured. The expression "J(4TW)" is determined based upon the predicted absolute position of the head from an expression for $x_p(n)$ to be described later. This is possible because the state estimator is designed such that the error between the *measured* absolute head position, $x_a$, and the predicted *absolute* head position, $x_p$, is always less than two track widths. Thus $x_a$ is computed by determining J, which is the number of integral multiples of four-track bands, in the predicted absolute head position $x_p$. (The predicted position $x_p$ can be considered as a distance equal to some integral multiple J of four-track bands plus a remainder or fraction of a four-track band). In this manner the term J is used to compute $x_a$ in equation (4).

Figure 5:
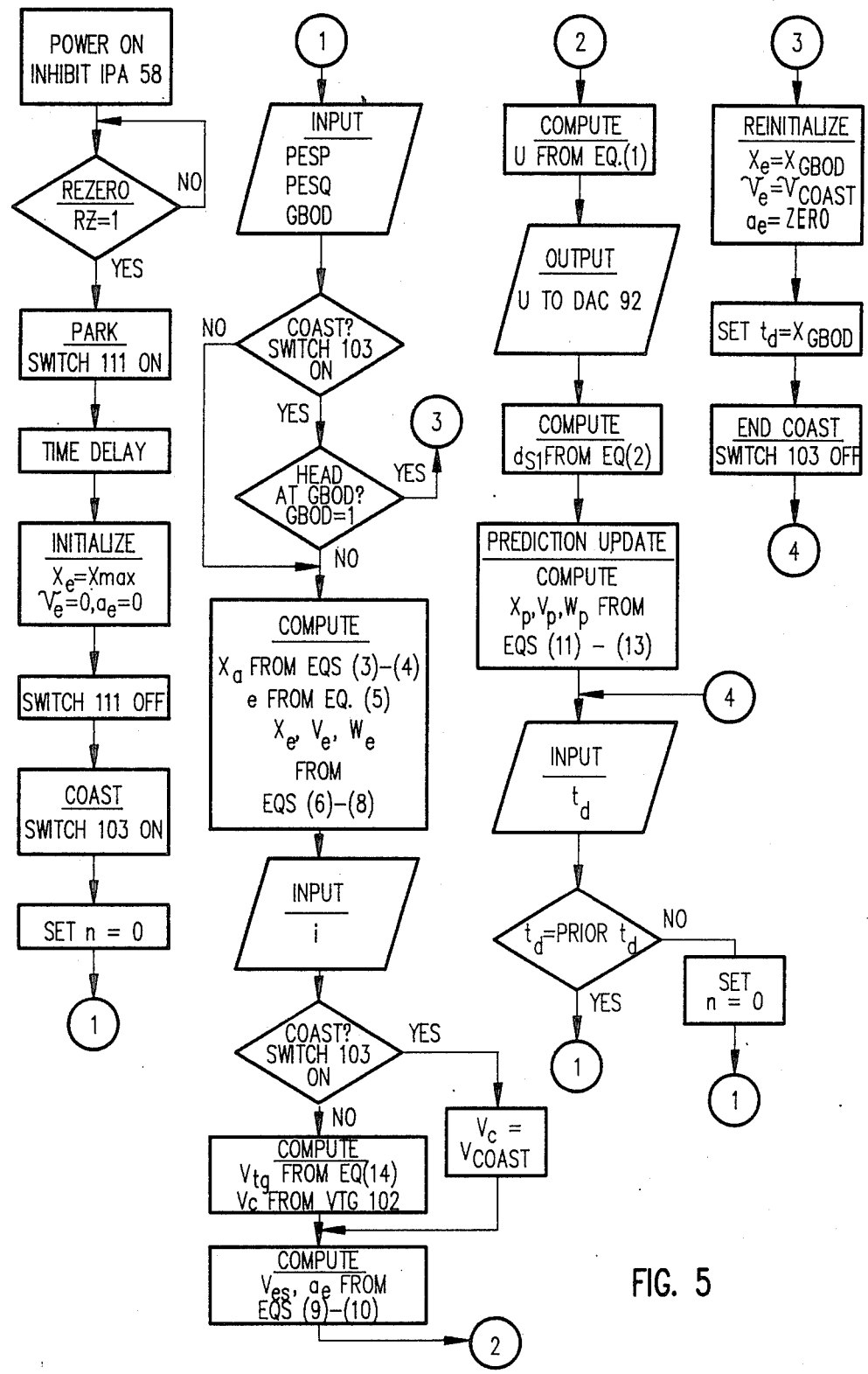
FIG. 5 is a flow chart of the state estimator and control signal algorithm.

Referring again to the flow chart of FIG. 5, after the computation of $x_a$, the term e(n) is computed according to the following equation (5).

$$e(n) = x_a(n) - x_p(n) \quad (5)$$

The term e(n) is the error between the measured absolute head position, $x_a(n)$, and the predicted absolute head position, $x_p(n)$, for that sample.

The estimated head position and velocity and a term $w_e(n)$ are then computed according to the following equations (6)-(8).

$$x_e(n) = x_p(n) - L_1 \cdot e(n) \quad (6)$$

$$v_e(n) = v_p(n) - L_2 \cdot e(n) \quad (7)$$

$$w_e(n) = w_p(n) - L_3 \cdot e(n) \quad (8)$$

The term $x_p(n)$ in equation (6), $v_p(n)$ in equation (7), and $w_p(n)$ in equation (8) are the *predicted* position, velocity and bias force equivalent VCM current, respectively. These terms have been computed during the prediction update phase from the prior sample, and will be explained with reference to that portion of the flow chart of FIG. 5. The term $w_e(n)$ in equation (8) is the *estimated* bias force component of the total VCM current required to give the estimated acceleration of servo head 32. The $L_i$ terms in equations (6)-(8) are constants.

Referring again to the flow chart of FIG. 5, the measured VCM current sample, i, is input to microprocessor 80. After the current has been input to microprocessor 80, then a decision is made as to whether the servo control system is still in coast, i.e. whether the head is still moving from the inside diameter crash stop towards the guard band outside diameter. If switch 103 is still on, then the coast phase is still in progress, the commanded velocity, $v_c$, is set equal to $v_{coast}$, and VTG 102 is bypassed.

The following equations (9) and (10) are then computed.

$$v_{es}(n) = v_c(n) - v_e(n) \quad (9)$$

$$a_e(n) = (K_f/M)[i(n) + w_e(n)] \quad (10)$$

The velocity error signal from equation (9) is the difference between the commanded velocity, in this case $v_{coast}$, and the estimated velocity, $v_e(n)$. The estimated acceleration $a_e(n)$ in equation (10) is proportional to the sum of the measured VCM current i(n) and the term $w_e(n)$, the estimated bias force equivalent current. The term $w_e(n)$ is an estimate of the VCM current required to compensate for bias forces. The proportional constant $K_f/M$ in equation (10) is the actuator force constant divided by the actuator mass.

After $v_{es}(n)$ and $a_e(n)$ have been computed in equations (9) and (10) the control signal u(n) is computed according to equation (1) and output to DAC 92.

The microprocessor 80 next computes the term $d_{s1}(n)$ from equation (2) and the predicted head position $x_p(n)$, velocity $v_p(n)$ and bias force equivalent current $w_p(n)$ from the following equations (11)-(13).

$$x_p(n) = x_e(n-1) + g_{11} \cdot u(n-2) + g_{21} \cdot u(n-1) + \quad (11)$$

$$g_{31} \cdot i(n-1) + p_{12} \cdot v_e(n-1) + p_{13} \cdot w_e(n-1)$$

$$v_p(n) = v_e(n-1) + g_{12} \cdot u(n-2) + g_{22} \cdot u(n-1) + \quad (12)$$

$$g_{32} \cdot i(n-1) + p_{23} \cdot w_e(n-1)$$

$$W_p(n) = w_e(n-1) \quad (13)$$

As is apparent, the *predicted* terms $x_p(n)$, $v_p(n)$ and $w_p(n)$ are functions of prior control signals, the prior measured VCM current and the prior *estimated* head position, velocity and bias force equivalent current.

As shown in the flow chart of FIG. 5, the counter is then incremented by one, to n+1. If there is no change in the target track, then control is returned for receipt of the next PESP(n) and PESQ(n) input.

The above-described routine for the computation of the control signal u during the coast phase continues so long as GBOD equals zero. When the servo head 32 reaches the guard band outside diameter, then GBOD equals 1 and control transfers to connector 3 (FIG. 5). At this point the coast phase has been completed and the estimated values are re-initialized. The estimated head position $x_e$ is set equal to $x_{GBOD}$ (the absolute position of the guard band outside diameter), the estimated velocity $v_e$ is set equal to $v_{coast}$, and the estimated acceleration $a_e$ is set equal to zero. The target track $t_d$ is then set equal to $x_{GBOD}$.

The coast phase is terminated by "switching off" switch 103. Control is transferred back to connector 4 (FIG. 5) for receipt of a target track command. If control unit 86 sends a command different than $t_d = x_{GBOD}$, then a track seek will begin. The counter is reset to n=0, and control is transferred back to connector 1 (FIG. 5). The same computations as previously described occur with the exception that when the second decision point for switch 103 is reached, the distance-to-go, $x_{tg}$, and new commanded velocity, $v_e$, are computed according to the following equations (14) and (15).

$$x_{tg}(n) = t_d - x_e(n) \tag{14}$$

$$v_c(n) = F[x_{tg}(n)] \tag{15}$$

The total error signal, $x_{tg}$, computed according to equation (14) is merely the difference between the absolute position of the target track centerline and the estimated absolute head position. The function term in equation (15) represents the output from VTG 102 and is a non-linear function of $x_{tg}(n)$ during track seeking and a linear function, $k_1 x_{tg}(n)$, during track following. During the seek the control signal u continues to be calculated according to equation (1) for each sample and output to DAC 92. The seek continues and the counter is incremented to $n+1$ until a new target track command, $t_d$, is received. Even at the completion of a seek, the above-described sampling of PESP(n), PESQ(n) and i(n), and the computation of u(n), continue. This is now the track following mode, which, from the perspective of the state estimator and control signal algorithm, is indistinguishable from track seeking.

The $g_{ij}$ and $p_{ij}$ in equations (11)–(13) are constants determined from a physical model of the actuator, including such parameters as the mass of the coil and arm assembly, the frictional effects, the force constants, and the digital sampling time. A description of the manner in which the $g_{ij}$ and $p_{ij}$ constants are generated for a physical system is given by Franklin and Powell in *Digital Control of Dynamic Systems*, Addison-Wesley Publishing Co. (1983), Chapter 6, pp. 131–139.

The $k_{si}$, $L_i$, and $k_i$ constants, as shown in FIG. 2 and used in control signal equation (1) and equations (6)–(8), are selected constants which yield the desired overall servo control system requirements for servo bandwidth, closed-loop pole locations and transient response. The specific values of these constants are a direct function of system design objectives and the specific hardware to be controlled.

With the use of this state estimator and control signal algorithm in the digital servo control system there is but one servo control system, which is identical in function during both track seeking and track following. There is no switching of a stiffness integrator into the servo control system during track following. The only difference between track seeking and track following is that during track following, when the head has approached to within approximately one-half track of the centerline of the target track, the function of distance-to-go output from VTG 102 is now a linear function represented as $k_1 x_{tg}$.

The control signal represented by equation (1) is a function of the prior control signal; the velocity error signal, which in turn is a function of the estimated head velocity and the total error signal; and the estimated head acceleration, which in turn is a function of the measured VCM current and the estimated bias force equivalent VCM current. Thus, the control signal can be represented in functional terms as follows:

$$u(n) = F_n\{u(n-1), v_c(n), x_{tg}(n), i(n), w_e(n)\} \tag{16}$$

where $F_n$ merely represents the function expressed by equation (1). During track following the mean or expected value of absolute head position $x_e$ is a constant and the mean or expected value of the head velocity $v_e$ is zero. Similarly, during track following the prior control signal $u(n-1)$ has a mean or expected value of zero. The state estimator estimates the bias force equivalent VCM current, $w_e$, so that the total acceleration estimate, which is $(K_f/M) \cdot [i(n) + w_e(n)]$, has a mean or expected value of zero. In this manner the only term remaining in equation (16) which has a non-zero mean or expected value is the total error signal, $x_{tg}$, which during track following is simply the PES. The PES is driven to zero by IPA 58 without the need for a separate switchable stiffness integrator. With the use of the state estimator in the digital servo control system as described herein to estimate $w_e$, there is thus no feedback path around IPA 58 that provides a gain in the presence of generally constant or very low frequency bias forces.

In addition, the use of the state estimator eliminates the necessity for counting or otherwise estimating track crossings, and thus permits the servo control system to be fully operable with sector servo information. The state estimator is designed, through the selection of constants $L_1$, $L_2$ and $L_3$ in equations (6)–(8), so that the measured absolute head position, $x_a(n)$, is always within less than two track widths of the predicted head position, $x_p(n)$. Thus, since it is only necessary to actually measure the position of the head within a four-track band, through the use of PES(n) and $t_q(n)$, it does not matter how many tracks have been crossed by servo head 32 between PES samples.

Figure 6:
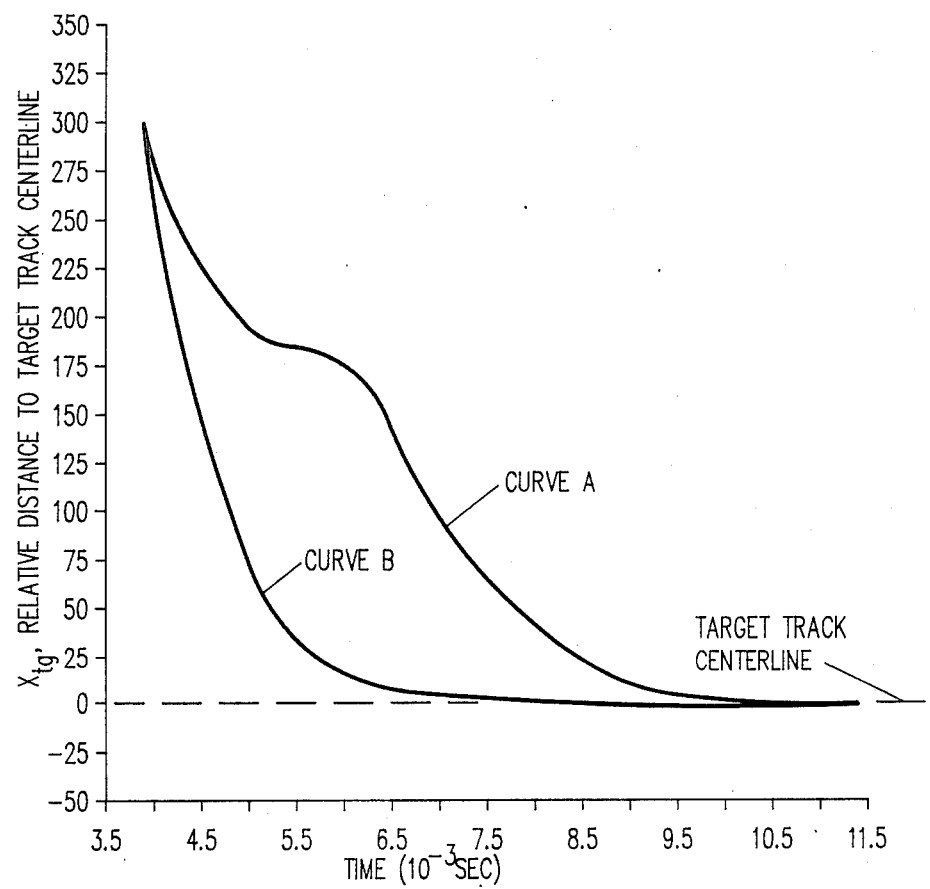
FIG. 6 is an illustration of head arrival trajectories for the digital servo control system with and without a switchable stiffness integrator in the presence of a large frictional bias force.

Referring now to FIG. 6, the improved arrival of servo head 32 to the centerline of the target track is shown with the use of the above-described digital servo control system. Curve A of FIG. 6 illustrates an arrival trajectory of head 32 to the centerline of a target track for a typical multiple track seek. The discontinuity at approximately 6.0 ms. is caused by the switching of a stiffness integrator into the servo feedback loop. The arrival trajectory of Curve A was simulated by the use of a digital servo control system identical to that shown in FIG. 4 but in which a digital stiffness integrator (not shown) was located between summing junction 101 and VTG 102. This stiffness integrator was switched into the loop to drive $x_{tg}$ to zero when the servo head 32 was within approximately one-half track of the centerline of the target track. In comparison with the arrival trajectory of Curve A, the trajectory of Curve B in FIG. 6 shows a smooth, continuous arrival of servo head 32 to the centerline of the target track. This arrival was reached with the digital servo control system of the present invention, i.e. without a switchable stiffness integrator.

Figure 7:
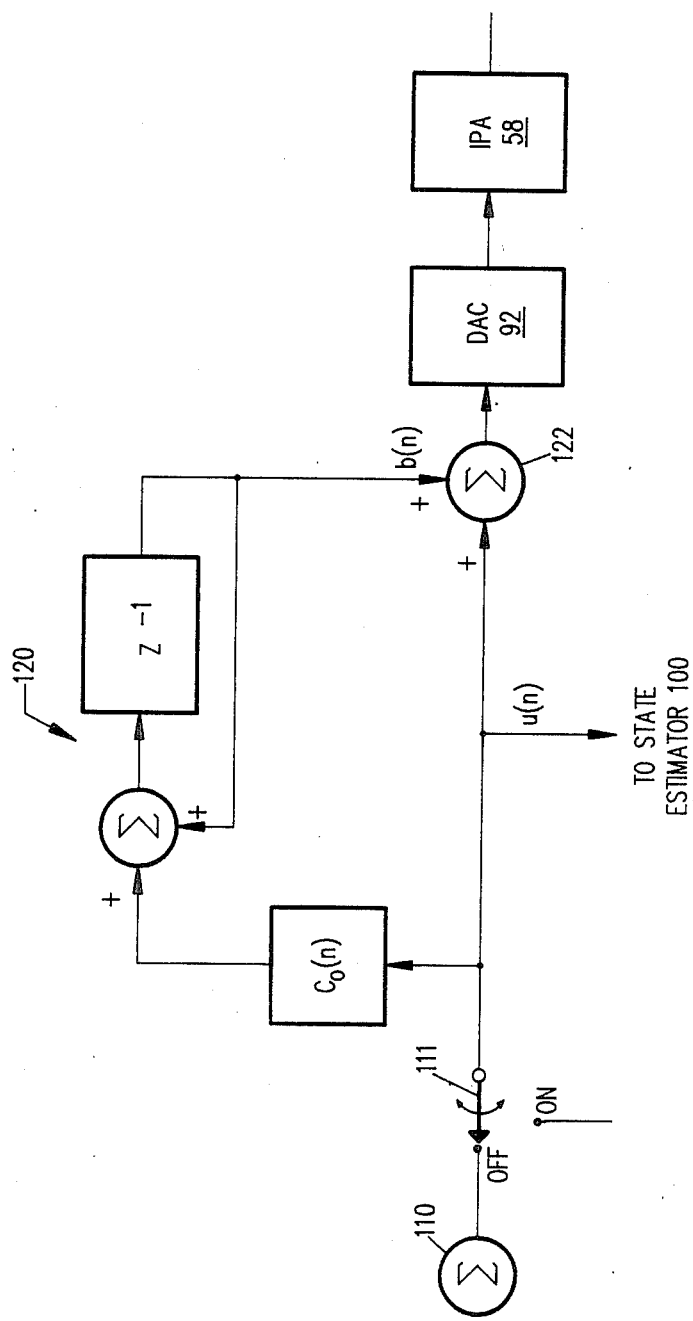
FIG. 7 is an illustration of a digital integrator in the digital servo control system to compensate for an input voltage offset to the integrating power amplifier.

Referring now to FIG. 7, there is illustrated a modification to the above-described digital servo control system which compensates for an offset input voltage to IPA 58. Even in the presence of no input to DAC 92, there can be an output voltage offset on DAC 92 and an input voltage offset to IPA 58. The value of this offset can vary with time and temperature. In order to compensate for this offset during track following, the control current u(n) is digitally integrated by digital integrator 120. This results in a correction factor b(n) summed with the control signal u(n) to compensate for an input signal offset to IPA 58. The equation computed by microprocessor 80 is expressed as follows:

$$b(n) = b(n-1) + c_0(n) \cdot u(n-1), \tag{17}$$

where $c_0$ is a non-zero positive constant. During track seeking the microprocessor sets $c_0(n)$ equal to zero. where $c_0$ is a non-zero positive constant. During track seeking the microprocessor sets $c_0(n)$ equal to zero.

Thus the digital integration and updating of b(n) for voltage offset only occurs during track following. The use of integrator 120, by setting $c_0(n)$ equal to a non-zero value, causes no adverse effects because the variation in the value of b is extremely slow relative to any bias force variations which can occur over the time it takes to do any track seek.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for controlling the data track seeking and following of a head in a data recording disk file of the type having a disk with servo information thereon defining data track centerlines, a head for reading samples of the servo information during rotation of the disk, an actuator connected to the head and responsive to an input signal for positioning the head to the centerline of a target track during track seeking and maintaining the head over the centerline of the target track during track following, the method comprising the steps of:

generating from the servo information a sampled head position error signal (PES) representative of the position of the head relative to the centerline of the nearest track;

estimating, for each PES sample, the absolute head position, relative to a fixed reference, and the head velocity;

estimating, for each PES sample, the equivalent actuator input signal required to compensate for bias forces acting on the actuator;

measuring, for each PES sample, the input signal to the actuator;

computing, for each PES sample, a commanded head velocity as a function of the distance from the estimated absolute head position to the target track;

computing, for each PES sample, the head velocity error as a function of the difference between the commanded head velocity and the estimated head velocity;

estimating, for each PES sample, the head acceleration as a function of the measured actuator input signal and estimated bias force equivalent actuator input signal;

generating, for each PES sample, a control signal as a function of the head velocity error, the estimated head acceleration, and the control signal generated for the prior PES sample;

integrating the control signal;

providing the integrated control signal as the input signal to the actuator;

storing, for each PES sample, the estimated absolute head position, the estimated head velocity, the estimated bias force equivalent actuator input signal, the measured actuator input signal and the control signal;

predicting, for each PES sample, the absolute head position and the head velocity as functions of prior control signals, the prior estimated absolute head position, the prior estimated head velocity, the prior estimated bias force equivalent actuator input signal and constants representative of physical parameters of the actuator, the predicted absolute head position and velocity for each PES sample being used during the step of estimating the absolute head position and head velocity for the subsequent PES sample; and predicting, for each PES sample, the bias force equivalent actuator input signal as a function of the prior estimated bias force actuator input signal, the predicted bias force equivalent actuator input signal for each PES sample being used during the step of estimating the bias force equivalent actuator input signal for the subsequent PES sample.

2. The method according to claim 1 wherein the servo information is of the type providing a primary signal and a quadrature signal from a quadrature pattern recorded in radially repetitive four-track bands, each track in the band being a unique track type, and wherein the step of generating the PES includes the step of determining, from the primary and quadrature signals, which of the four track types the head is on.

3. The method according to claim 1 wherein the servo information is recorded in radially repetitive bands, each band containing a fixed number of uniquely identifiable tracks, and wherein the step of estimating the absolute head position includes the step of measuring the position of the head within a band without detecting or estimating track crossings by the head.

4. The method according to claim 2 wherein the step of measuring the position of the head within a band includes the steps of identifying the specific track number over which the head is located within the band, multiplying the identified track number by the track width, and summing the resultant product with the PES.

5. The method according to claim 3 wherein the step of estimating the absolute head position further comprises the step of determining a distance equivalent to the integral number of bands comprised by the predicted absolute head position and summing that distance with the measured head position within a band, thereby computing a measured absolute head position.

6. The method according to claim 1 wherein the actuator is a voice coil motor (VCM), wherein the step of measuring the actuator input signal further comprises the step of measuring the input current to the VCM, and wherein the step of estimating the bias force equivalent actuator input signal further comprises the step of estimating the equivalent VCM current to compensate for bias forces.

7. The method according to claim 1 wherein the step of estimating the head acceleration further comprises the step of estimating the head acceleration to have a mean value of zero when the expected value of the head position is a constant.

8. The method according to claim 1 wherein the disk file is of the type also having integration means coupled to the actuator, and further comprising the steps of, prior to integrating the control signal, adding to the control signal a correction signal to compensate for an input voltage offset in the integrating means, and updating the correction signal during track following.

9. A method for controlling the data track seeking and following of a head in a data recording disk file of the type having servo information recorded as radially repetitive bands of a fixed number of uniquely identifiable tracks either as continuous tracks on a dedicated servo disk surface or as sectors of tracks on a data disk surface, a head for reading the servo information during rotation of the disk, means for demodulating the servo information read by the head to provide an analog position error signal (PES) representative of the position of the head relative to the centerline of the nearest track, a voice coil motor (VCM) connected to the head for positioning the head to the centerline of a target track during track seeking and maintaining the head over the centerline of the target track during track following, an integrating power amplifier for integrating and amplifying an analog control signal so as to provide an input current to the VCM, the method comprising the steps of:

generating, from the analog PES, a digital PES sample;

identifying, from the analog PES, the track within a band corresponding to the track from which the PES sample was generated;

measuring, from the PES sample and the identified track, the position of the head within a band;

estimating, from the measured position of the head within a band, the absolute head position relative to a fixed reference;

estimating the head velocity;

estimating the equivalent VCM input current required to compensate for bias forces;

measuring the digital value of input current to the VCM at the time of the PES sample;

computing a commanded head velocity as a function of the difference between the estimated absolute head position and the absolute position of the target track;

computing the head velocity error as a function of the difference between the commanded head velocity and the estimated head velocity;

estimating the head acceleration as a function of the measured VCM input current and estimated bias force equivalent VCM current, the step of estimating the head acceleration including the step of estimating the average head acceleration to be zero during track following;

generating a digital control signal as a function of the head velocity error, the estimated head acceleration, and the control signal generated for the prior PES sample;

converting the digital control signal to an analog control signal;

directing the analog control signal to the integrating power amplifier to thereby position the head toward the centerline of the target track in response to the received digital PES sample;

predicting the absolute head position relative to a fixed reference and the head velocity as functions of prior digital control signals, the prior estimated absolute head position relative to the fixed reference, the prior estimated head velocity, the prior estimated bias force equivalent VCM current and constants representative of physical parameters of the actuator; and predicting the bias force equivalent VCM current as a function of the estimated bias force equivalent VCM current for the prior PES sample, wherein the steps of estimating the absolute head position, the head velocity and the bias force equivalent VCM current include the step of computing the error between the measured absolute head position relative to a fixed reference and the predicted absolute head position for each PES sample.

10. The method according to claim 9 wherein the servo information is a quadrature pattern, wherein the demodulator provides an analog primary PES and an analog quadrature PES from the quadrature pattern servo information, and wherein the step of generating a digital PES sample includes the steps of generating a primary PES sample (PESP) and a quadrature PES sample (PESQ) and selecting either PESP or PESQ as the PES sample.

11. The method according to claim 9 further comprising the steps of providing a digital correction signal to compensate for voltage offsets in the integrating power amplifier, summing the correction signal with the digital control signal prior to converting the digital control signal to an analog control signal, and updating the correction signal during track following.

12. An improved data recording disk file of the type having means for processing commands received from a disk file control unit, at least one rotatable disk with generally concentric data tracks thereon, the data disk or a separate servo disk having servo information recorded thereon, at least one head for reading the servo information during rotation of the disk and for providing an analog servo signal, a demodulator for processing from the analog servo signal a head position error signal (PES) representative of the distance of the head from the nearest track centerline, an actuator responsive to an input signal and attached to the head for positioning the head to the centerline of a target track in response to a command from the control unit and for maintaining the head over the centerline of the target track during a read or write operation, the actuator having predetermined physical parameters and being subjected to generally constant or low frequency bias forces during operation of the disk file, the improvement comprising:

analog-to-digital conversion means for the analog PES received from the demodulator;

means for measuring the analog actuator input signal;

analog-to-digital conversion means for the measured actuator input signal;

means for computing, from the digital PES, the measured absolute head position relative to a fixed reference and for computing an estimate of the head velocity and an estimate of the actuator input signal required to compensate for bias forces acting on the actuator;

a velocity trajectory generator for generating a value representative of the optimum velocity of the head as a function of the difference between the absolute position of the target track and the estimated absolute head position;

means for computing a value representative of the velocity error as a function of the difference between the optimum velocity and the estimated head velocity;

means for computing an estimate of the head acceleration as a function of the digital actuator input signal and the estimated bias force equivalent actuator input signal;

means for computing a digital control signal as a function of prior digital control signals, the value representative of the velocity error and the estimated head acceleration;

means for converting the digital control signal to an analog input signal to the actuator;

means for storing the digital values representative of the control signals, the measured actuator input signals, the estimated head position and head velocity, the bias force equivalent actuator input signals, and constants representing predetermined physical parameters of the actuator; and means for predicting the absolute head position, head velocity, and bias force equivalent actuator input signal from the estimated absolute head position, head velocity and bias force equivalent actuator input signal, respectively, computed from the prior digital PES sample, whereby the error between the measured absolute head position and the predicted absolute head position is used to generate the estimated absolute head position, the estimated head velocity and the estimated bias force equivalent actuator input signal.

13. The improvement according to claim 12 wherein the servo information is recorded in radially repetitive bands of a fixed number of tracks per band, and wherein the demodulator provides a primary analog servo signal and a quadrature analog servo signal, wherein the analog-to-digital conversion means for the PES received from the demodulator includes means for generating a digital primary PES (PESP) and a digital quadrature PES (PESQ), and further comprising means for identifying from the digital PESP and PESQ the specific track within a band over which the head is located.

14. The improvement according to claim 12 wherein the means for computing an estimate of head acceleration includes means for estimating the average head acceleration during track following to be zero.

15. The improvement according to claim 12 wherein the means for converting the digital control signal to an analog actuator input signal includes an integrating power amplifier.

16. The improvement according to claim 15 further comprising means for computing a value representative of a correction signal as compensation for a voltage offset to the integrating power amplifier, means for adding the correction signal value to the digital control signal prior to conversion of the digital control signal to analog, and means for updating the correction signal value during track following.

* * * * *

UNITED STATES PATENT AND TRADEMARK OFFICE
CERTIFICATE OF CORRECTION

PATENT NO. : 4,679,103

DATED : July 7, 1987

INVENTOR(S) : M. L. Workman

It is certified that error appears in the above-identified patent and that said Letters Patent is hereby corrected as shown below:

IN THE SPECIFICATION:

Column 3, line 30, delete the word "IVENTION" and replace it with --INVENTION--.

Column 10, line 14, formula (2), "$d_{s1}(n) - v_{es}(n-1) + {}_{s4}d_{s1}(n-1).$"

should be --$d_{s1}(n) = v_{es}(n-1) + k_{s4}d_{s1}(n-1).$--

Column 14, lines 67 and 68, delete "where $c_0$ is a non-zero positive constant. During track seeking the microprocessor sets $c_0(n)$ equal to zero."

Signed and Sealed this

Seventeenth Day of November, 1987

Attest:

DONALD J. QUIGG

*Attesting Officer*       *Commissioner of Patents and Trademarks*